Aug. 30, 1938.  L. BLOCH  2,128,344
COOLER
Filed Nov. 4, 1933  3 Sheets-Sheet 3
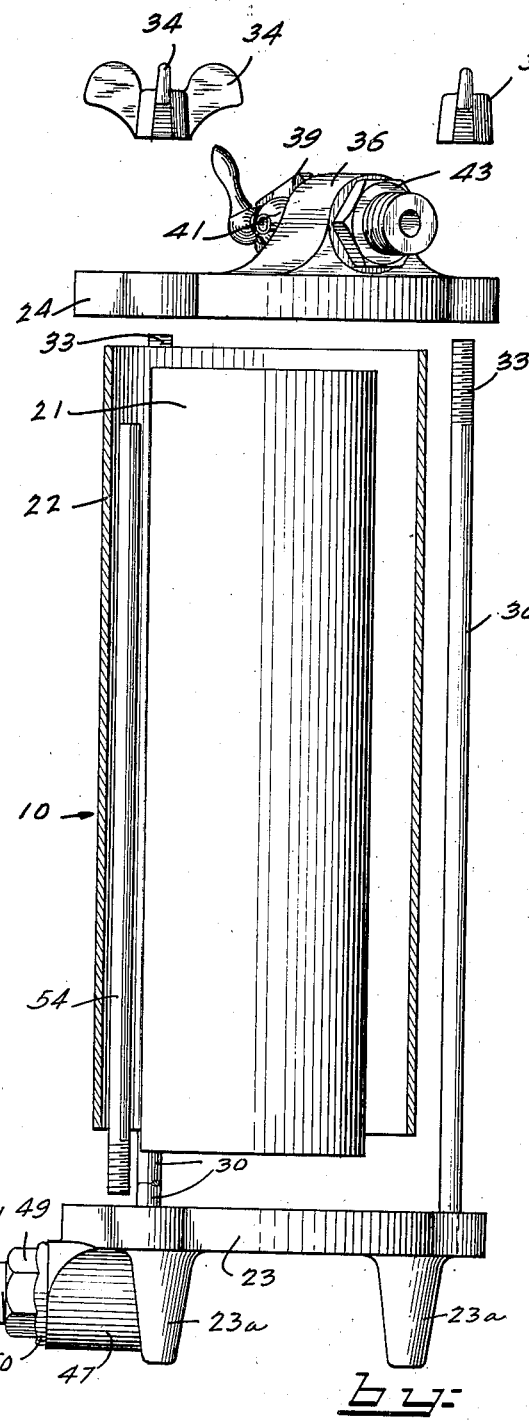
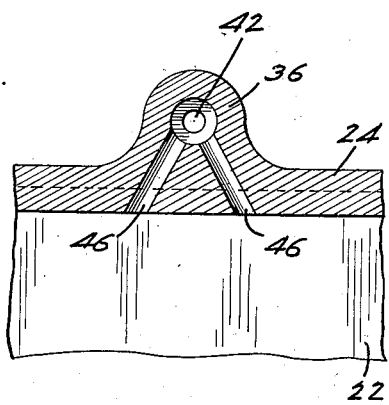
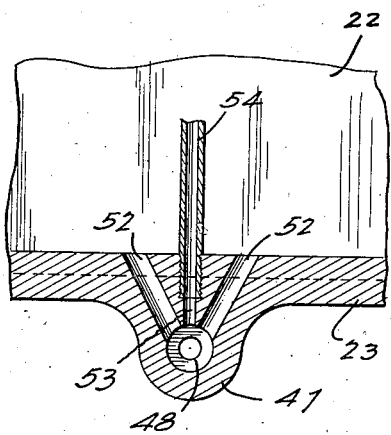
Inventor
LEON BLOCH Patented Aug. 30, 1938

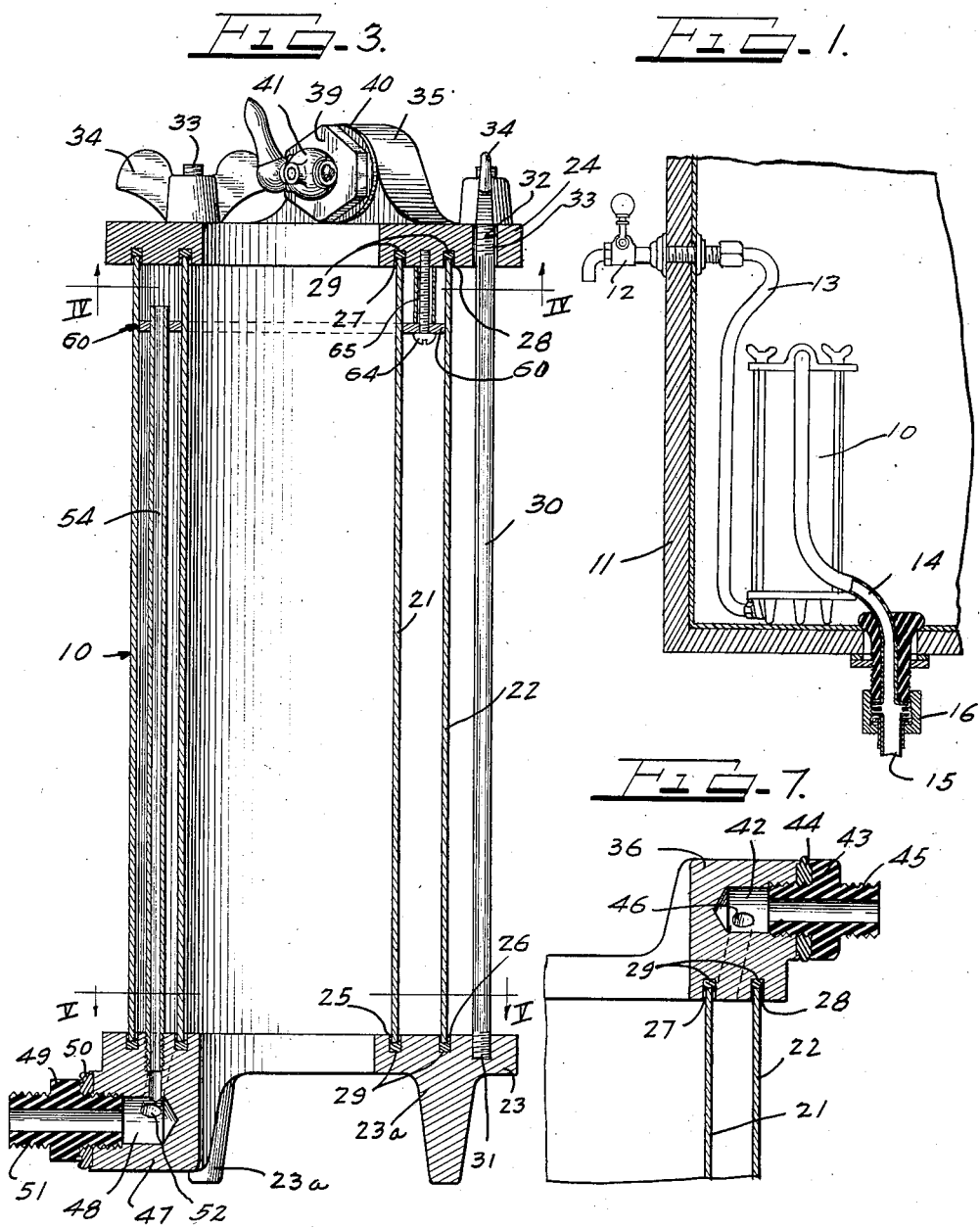

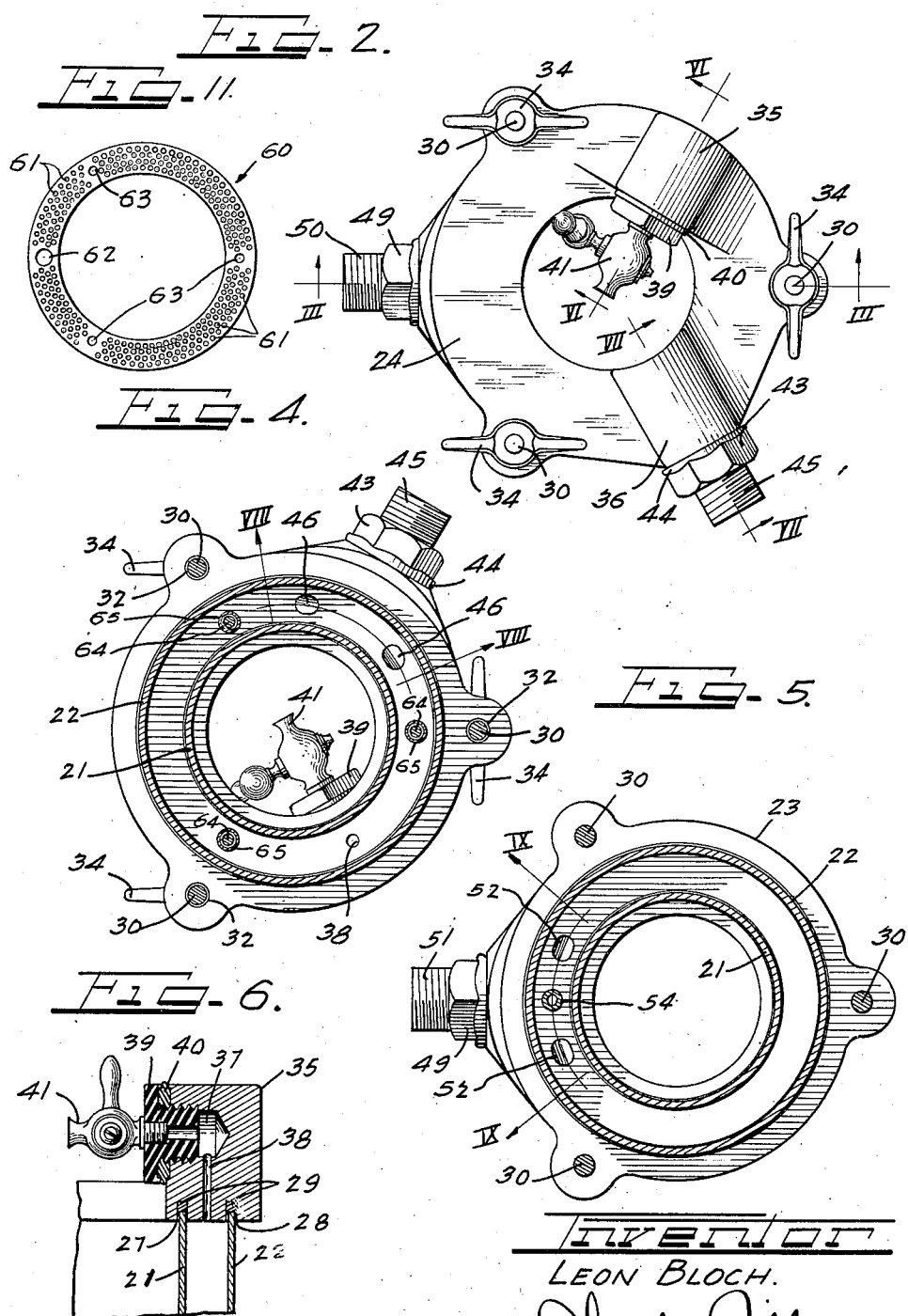

2,128,344

UNITED STATES PATENT OFFICE 2,128,344

COOLER

Leon Bloch, Cleveland, Ohio, assignor to August L. Voight, Lakewood, Ohio

Application November 4, 1933, Serial No. 696,635

2 Claims. (Cl. 225—40)

This invention relates to a device for cooling fluids.

More specifically, this invention relates to a coilless beer cooler adapted to be packed in ice or surrounded by refrigerator coils, and capable of delivering cooled beer without loss of entrained gases thereby preventing beer in the cooler from becoming stale.

Heretofore, fluids, such as beers, have been cooled by passage through coils packed in ice. The fluid container, such as a beer barrel, was connected through a hose or flexible pipe to the bottom of the cooling coil. The fluid was forced upward through the coil to a dispensing tap by forcing a driving gas, such as air or carbon dioxide, into the barrel. The driving gases, together with the $CO_2$ in the beer itself, are always delivered to the tap since they cannot escape in the coil. As long as the beer flows through the coil the gases are entrained in the beer and the beer is dispensed as "live" beer. However, if the beer stands in the coil for a considerable time, the gases tend to rise in the coil and are delivered ahead of the liquid stale beer.

The cooling coils have usually been made of block tin or tin galvanized copper pipes. The top end of the cooling coil is generally connected, by means of a brass coupling, to a brass or nickel dispensing tap, while the bottom end of the coil is usually connected, by means of a brass coupling, to the barrel hose or flexible pipe.

It is well known that if the beer barrel has not been pre-cooled before it is opened, the first delivery foams through the coil and must be discarded as "wild" beer until the liquid beer begins to flow. This means that each time a barrel is opened, there is a considerable loss of beer.

It is also known that if beer is allowed to stand in the coil over night, it becomes flat or stale and must be drawn off and thrown away. The spoiling of the beer in the coil is also hastened by an electrolysis action set up by the direct joining of the tin coil with the brass or other metal couplings. These metals are of a different potential and have a common electrolyte (beer) contacting both of them which results in an electrolysis action on the beer. This means that, for economical dispensing, the cooling coils must be limited in size so as to avoid waste of large quantities of beer each day. However, reduction in the size of the coil also reduces its cooling capacity so that if the beer is dispensed rapidly from the tap it does not remain in the coils for a sufficient time to be cooled and consequently becomes "wild" and foams out of the tap. Therefore, if much beer is to be dispensed, two or more separate coils and taps are required where one would be sufficient if the cooling capacity of the coil were great enough.

The cleaning of beer coils has always been difficult requiring the use of a specially designed steam blowing apparatus.

Beer cooling compartments or chambers, while more readily cleaned than coils, are in general unsatisfactory, because if beer is allowed to stand in the cooler, the entrained gases therein rapidly rise to the top. These liberated gases, if not allowed to escape, will eventually build up a pressure which decreases the amount of beer that can enter the chamber. The cooler then becomes "gas bound". To prevent this, some beer cooling systems provide for an automatic release of the gases at the top of the cooler. These "constant pressure" types of coolers are condemned by the brewers because the $CO_2$ gas initially in the beer is wasted and a flat beer is dispensed.

I have now provided a fluid cooler for beer and the like which overcomes all of the above disadvantages and in addition, possesses many added advantages.

In accordance with my invention, concentric tubular shells of a non-corrosive material having high cold conductivity are sealed at their ends with a removable annular head and a removable annular base for connection with the beer barrel and dispensing tap respectively. The connecting couplings, however, are formed of a non-conducting insulating material, such as "Bakelite" (a phenol-aldehyde condensation product), hard rubber, or the like. The cooler is packed in ice or cooled by mechanical refrigeration and the fluid to be cooled, such as beer, is introduced into the space between the tubular shells. The fluid is introduced at the top of the cooler and is dispensed to the dispensing tap from the bottom of the cooler. In this manner a constant head of liquid is maintained in the cooler for delivery to the tap. If beer is being cooled, however, a gas syphon pipe extends from the discharge end of the cooler to within a short distance from the top for syphoning those gases which have collected on the top of the cooler back into the liquid beer with each withdrawal of beer from the cooler. I may also insert a foam dispensing device in the top of the cooling chamber.

The head, base and tubular shells of my cooler are preferably formed of pure aluminum. This material has high cold conductivity and is non-corrosive. Because the cooler is thoroughly insulated from brass or other metal couplings or pipes and is formed of a material which has no action on the beer, beer can remain in the cooler for a considerable length of time without becoming stale. The cooler can therefore be made large enough so as to have a high cooling capacity and thus a single cooler may take the place of two or more of the usual tin coils which must be limited in size because of the spoiling of any beer allowed to remain in the coils over night.

It is therefore an object of this invention to provide a cooler having a high cooling capacity and being inert toward any corrosive action of the fluid being cooled.

Another object of this invention is to provide a cooler for fluids which is readily disassembled for cleaning and easily re-assembled for usage after cleaning.

Another object of this invention is to provide a beer cooler capable of delivering cooled beer with all of its initial gases entrained therein.

Another object of this invention is to provide a beer cooler insulated from metallic couplings and pipes which cause an electrolysis and spoiling of the beer.

Another object of this invention is to provide a coilless fluid cooler having high cooling capacity.

Another object of this invention is to provide a beer cooler with a foam dispensing attachment to prevent delivering of "wild" beer.

Another object of this invention is to provide an aluminum beer cooler which may be completely insulated from metallic contact with other metals so as to prevent the electrolysis of beer in the cooler.

Other and further objects of this invention will be apparent to those skilled in the art from the following specification and accompanying drawings which form a part of this specification.

On the drawings:

Figure 1 is a broken vertical cross-sectional view of the usual type of ice chest and beer tap showing the manner in which a cooler according to this invention is mounted therein.

Figure 2 is a top plan view of the cooler of this invention.

Figure 3 is a vertical cross-sectional view taken along the line III—III of Figure 2.

Figure 4 is a horizontal cross-sectional view taken substantially along the line IV—IV of Figure 3.

Figure 5 is a horizontal cross-sectional view taken substantially along the line V—V of Figure 3.

Figure 6 is an enlarged cross-sectional view taken substantially along the line VI—VI of Figure 2.

Figure 7 is a vertical sectional view taken substantially along the line VII—VII of Figure 2.

Figure 8 is a horizontal sectional view taken substantially along the line VIII—VIII of Figure 4.

Figure 9 is a cross-sectional view taken substantially along the line IX—IX of Figure 5.

Figure 10 is an elevational view, with parts in cross-section, of the cooler showing the manner in which the various parts are disassembled for cleaning.

Figure 11 is a plan view of the foam dispensing plate which may be inserted near the top of the cooler.

As shown on the drawings:

In Figure 1, the reference numeral 10 designates a cooler according to this invention mounted in the usual beer-cooling ice chest 11. A dispensing tap 12 is secured in a side wall of the ice chest 11. The bottom of the cooler 10 is connected with the dispensing tap 12 through a pipe 13. The top of the cooler 10 is connected through a tube or pipe 14 to a hose 15 from the beer barrel by means of a coupling 16. As shown in this figure, beer, or other fluid, from a container (not shown) is forced through the hose 15 and into the tube 14 from which it passes into the head of the cooler. When the tap 12 is opened, the fluid under pressure in the cooler 10 flows through the pipe 13 from the bottom of the cooler. It is obvious, of course, that the cooler 10 is packed in ice or cooled by mechanical refrigeration in the ice chest 11.

As best shown in Figures 3 and 10, the cooler 10 comprises concentric equal length tubes 21 and 22 held in fixed spaced relation from each other by an annular base 23 and an annular head 24. The annular base 23 is provided with legs 23a forming a support for the cooler. The top surface of the base 23 is cut with a circular groove 25 for receiving the bottom of the tube 21. A larger circular groove 26 is also provided in the base 23 for receiving the bottom of the large tube 22. Likewise, the head 24 is grooved in its bottom face with a small circular groove 27 and a larger groove 28 for receiving the tops of the tubes 21 and 22, respectively. Each of the grooves 25, 26, 27 and 28 is provided with a rubber or other form of gasket material 29, which is placed at the bottom of the grooves.

The base 23 has secured therein, a plurality of rods 30 which extend vertically therefrom. The rods 30 may be screwed into the base as shown at 31 in Figure 3 or may be secured to the base in any desired manner. The rods are positioned outside of the tube 22 and extend upward through holes 32 in the head 24.

The tops of the rods 30 are threaded as shown at 33 and extend through the holes 32.

Wing nuts 34 are screwed down on the screw threads 33 of the rods 30 so as to engage the top surface of the head 24. In this manner, the head 24 and base 23 are clamped against the ends of the tubes 21 and 22 and the device is held together in assembled position. As shown in Figures 2, 4, and 5, three rods 30 are sufficient to hold the cooler in assembled position.

The head 24 has two raised portions 35 and 36 on its top surface. These raised portions or ears 35 and 36 are cast integrally into the head. The raised portion 35, as shown in Figure 6, is provided with a bore 37 extending horizontally from the inside. The bore does not extend through the raised portion 35 but terminates above a bleeder passageway 38 which leads into the space between the tubes 21 and 22.

A hard rubber or bakelite coupling 39 is screwed into the bore 37 and is held in air-tight relation therein by means of a gasket 40. A petcock 41 is fitted into the coupling 39 thereby permitting the escape of gases and excess foam from the cooling space between the tubes 21 and 22.

As best shown in Figure 7, the raised portion 35 of the top 24 is provided with a horizontal bore 42 extending inward from the outside of the raised portion 35 and terminating above the space between the tubes 21 and 22. A hard rubber or bakelite insulation coupling 43, is screwed into the bore 42 and held in air-tight relation therewith by means of a gasket 44. The coupling 43 is provided with screw threads extending therefrom for engagement with a metal coupling of a feed pipe or hose 14 shown in Figure 1.

Two passageways 46 lead from the bore 42 to the space between the tubes 21 and 22. As best shown in Figure 8, these passageways 46 are inclined at an angle from the vertical so as to direct the fluid being inserted into the cooling space between the tubes in a swirling manner against the cooling surfaces of the tubes. The fluid is thus prevented from dropping vertically and splashing against the bottom of the cooling space. The swirling motion permits an unagitated entry of the fluid, thereby preventing excess foaming of beer or other foaming liquids.

The base 23 has a portion 47 on its under surface extending between two of the legs 23a. A bore 48 is drilled horizontally from the outside of the portion 47 and terminates under the space between the tubes 21 and 22. An insulating coupling 49 is screwed into the bore 48 and held in air tight relation therewith by means of a gasket 50. The coupling 49 is provided with screw threads 51 on its outside for receiving a dispensing hose or tube, such as the hose 13 shown in Figure 1.

Two passageways 52 lead from the bore 48 into the space between the tubes 21 and 22. These passageways are inclined at an angle from the vertical similar to the passageways 46. A third passageway 53 leads from the space between the tubes 21 and 22 into the bore 48. A pipe 54 is screwed into this passageway 53 and extends upward in the space between the tubes 21 and 22 terminating about an inch from the top of the tubes. This pipe 54 serves as a gas syphon when beer is dispensed through the bore 48 from the passageways 52. As will be apparent, liquid beer forms a solid head in the lower part of the space between the tubes 21 and 22 while some of entrained gases on the beer are released and collect on the top of this space. When the dispensing tap is open, liquid beer flows through the passageways 52 into the bore 48 thereby sucking gas through the pipe 54 and thus delivering a uniform amount of gas with the liquid beer since the amount of gas drawn is regulated by the amount of liquid drawn. The withdrawal of gas with the liquid beer re-inserts any of the lost gases into the beer and thus a fully carbonated beer is dispensed.

If desired a perforated annular plate 60 (Fig. 11) may be suspended into the top of the cooler from the head 24 as shown in Fig. 3. The plate 60 holds down the foam in the cooler and prevents loss of beer when the pet cock 41 is opened to allow the escape of gases and air when filling the cooler with beer.

The plate 60 is provided with a myriad of perforations 61, a hole 62 for the gas syphon pipe 54 and holes 63 for bolts 64 which hold the plate suspended from the head 24. The bolts may be screwed into the bottom surface of the head and have spacer collars 65, as shown in Figs. 3 and 4 for holding the plate rigidly in proper spaced relation from the head or the head 24 may be cast with lugs extending the proper distance into the cooler space and the plate bolted directly onto these lugs.

The plate 60 fits snugly against the inner walls of cooling space and is set just below the upper end of the syphon pipe 54. The perforations in the plate break up the gas bubbles which form the foam and allow the gases to rise where they may be tapped off through the valve 41 or syphoned off through the pipe 54.

If desired, an aluminum wire screen may be used in place of the plate 60.

From the above description, it will be evident that the cooler of this invention is readily disassembled for cleaning by a mere removal of the wing nuts 34. The top 24 is then slidable over the rods 30 and with the top removed the tubes 21 and 22 are readily removable.

When the cooler is installed for use as a beer cooler, beer from a container is forced through the feed tubes 14 into the bore 42 in the head 24 of the device. The beer then gently flows down along the inside surface of the tubes 21 and 22 and fills the space between the tubes. A solid column of liquid beer is thus formed in the space between the tubes and the form on the beer will occupy a space near the head of the device. If the cooler is packed in ice, the annular form of the head and base permits the cold ice water to flow upward along the outside surface of the inner tube 21, thereby aiding the cold conductivity to the beer. When the dispensing tap 12 is open, beer flows through the passages 52 in the base of the cooler into the bore 48 and up through the dispensing tube or hose 13. Because of the vacuum created in the withdrawal of the liquid beer through the passages 52, any gases which may have escaped from the beer in the cooler are drawn through the syphon tube 54 for dispensing with the beer. In this manner the cooler cannot become gas bound and a delivery of live beer is insured. The pet cock 41 permits the escape of excess gas which may be present when a keg of beer is first tapped and passed into the cooler.

I am aware that many changes may be made, and numerous details of construction may be varied through a wide range without departing from the principles of this invention, and I, therefore, do not purpose limiting the patent granted hereon otherwise than is necessitated by the prior art.

I claim as my invention:

1. A beer cooler comprising a container forming a cooling compartment, means for delivering beer to said compartment adjacent the top thereof, said container being provided with a pair of drain passageways adjacent the bottom of said compartment and converging together into a common discharge orifice, said container also being provided with a third passageway between said converging passageways and ending at the point of convergence, and a vertical tube extending upwardly from said third passageway opening to a point adjacent the top of the cooling compartment.

2. A fluid cooler comprising a container having a cooling space defined by spaced parallel curved walls, dispensing means for conducting the cooled fluid from said space, a head closing the upper end of said cooling space and a supply port in said head, said head being provided with a pair of inclined passageways diverging from the supply port and arranged to direct the incoming fluid in a swirling manner against one of said walls and into said cooling space.

LEON BLOCH.